(12) United States Patent
Livingston et al.

(10) Patent No.: US 10,351,108 B2
(45) Date of Patent: *Jul. 16, 2019

(54) SNOW AND ICE REMOVER FOR VEHICLE ROOFS

(71) Applicant: Quintin Machinery LLC, Lancaster, PA (US)

(72) Inventors: Howard Livingston, Lancaster, PA (US); William E. Yeaglin, Mount Joy, PA (US)

(73) Assignee: Quintin Machinery LLC, Lancaster, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/821,064

(22) Filed: Nov. 22, 2017

(65) Prior Publication Data

US 2018/0105148 A1    Apr. 19, 2018

Related U.S. Application Data

(63) Continuation of application No. 14/922,919, filed on Oct. 26, 2015, now Pat. No. 9,834,181, and a continuation-in-part of application No. 13/658,419, filed on Oct. 23, 2012, now Pat. No. 9,168,898, and a continuation-in-part of application No. 12/807,048, filed on Aug. 26, 2010, now Pat. No. 8,584,295.

(51) Int. Cl.
| | |
|---|---|
| *B60S 3/00* | (2006.01) |
| *B60S 3/04* | (2006.01) |
| *B08B 1/00* | (2006.01) |
| *B08B 1/02* | (2006.01) |
| *A46B 15/00* | (2006.01) |
| *A46B 17/02* | (2006.01) |
| *B60S 3/06* | (2006.01) |

(52) U.S. Cl.
CPC ............ *B60S 3/04* (2013.01); *A46B 15/0081* (2013.01); *A46B 17/02* (2013.01); *B08B 1/002* (2013.01); *B08B 1/005* (2013.01); *B08B 1/006* (2013.01); *B08B 1/02* (2013.01); *B60S 3/06* (2013.01); *A46B 2200/3046* (2013.01); *Y10S 15/02* (2013.01)

(58) Field of Classification Search
CPC ................. B60S 3/00; B60S 3/04; B60S 3/06
See application file for complete search history.

(56) References Cited

U.S. PATENT DOCUMENTS

| | | |
|---|---|---|
| 1,411,949 A | 4/1922 | Wilson |
| 1,492,894 A | 5/1924 | Perego |
| 1,611,273 A | 12/1926 | Kelso |
| 1,864,821 A | 6/1932 | Heuze |
| 2,708,446 A | 5/1955 | Phillips |

(Continued)

OTHER PUBLICATIONS

Website—www.durasweeper.com, dated Nov. 6, 2015, 3 pages.
Website—http://www.trynexfactory.com/sweepex.htm, dated Oct. 13, 2015, 3 pages.

*Primary Examiner* — Michael D Jennings
(74) *Attorney, Agent, or Firm* — Barley Snyder

(57) ABSTRACT

A snow and ice remover assembly for vehicle roofs having two vertical supports separated by a distance sufficient to move a vehicle between the vertical supports. A crossbar extends between and movable along the two vertical supports. A base structure is attached to the vertical supports and has wheels that engage a support surface upon which the snow and ice remover stands. A wheel movement prevention mechanism is also provided.

6 Claims, 5 Drawing Sheets

(56) References Cited

U.S. PATENT DOCUMENTS

| | | |
|---|---|---|
| 3,072,131 A | 1/1963 | Di Laurenzio |
| 3,104,406 A | 9/1963 | Rhodes |
| 3,439,372 A | 4/1969 | Collier |
| 3,459,203 A | 8/1969 | Pritchard |
| 4,815,158 A | 3/1989 | Crofts |
| 5,076,304 A | 12/1991 | Mathews |
| 5,160,430 A | 11/1992 | Gasser et al. |
| 5,245,771 A | 9/1993 | Walsh |
| 5,337,437 A | 8/1994 | Hingle |
| 5,669,981 A | 9/1997 | Stinnett et al. |
| 5,715,558 A | 2/1998 | Johnson |
| 5,802,654 A | 9/1998 | Yeaglin |
| 5,813,076 A | 9/1998 | Belanger et al. |
| 5,989,356 A | 11/1999 | Candeletti |
| 6,453,500 B1 | 9/2002 | Schmitt |
| 6,654,978 B2 | 12/2003 | Bouchard |
| 7,617,561 B2 | 11/2009 | Couture |
| 8,333,845 B2 | 12/2012 | Wentworth et al. |
| 8,584,295 B1 | 11/2013 | Yeaglin |
| 9,168,898 B2 | 10/2015 | Yeaglin |
| 2003/0051302 A1 | 3/2003 | Fazio |
| 2007/0174981 A1 | 8/2007 | Smith et al. |
| 2009/0199880 A1 | 8/2009 | Wentworth et al. |
| 2009/0217944 A1 | 9/2009 | Munera et al. |
| 2009/0282630 A1 | 11/2009 | Reed |
| 2009/0282708 A1 | 11/2009 | Reed |
| 2010/0017979 A1 | 1/2010 | Ennis |

SNOW AND ICE REMOVER FOR VEHICLE ROOFS

CROSS-REFERENCE TO RELATED APPLICATION

This application is a Continuation of U.S. patent application Ser. No. 14/922,919 filed Oct. 26, 2015 which is a continuation in part of U.S. patent application Ser. No. 13/658,419 filed Oct. 23, 2012 now U.S. Pat. No. 9,168,898 issued on Oct. 27, 2015, and U.S. patent application Ser. No. 12/807,048 filed Aug. 26, 2010 now U.S. Pat. No. 8,584,295 issued on Nov. 19, 2013.

BACKGROUND

This invention deals generally with brushing and cleaning and more specifically with cleaning snow and ice from the roofs of vehicles.

It is not an uncommon experience in localities which experience significant snowfall to see a slab of snow fly off the roof of a vehicle and strike a following vehicle. Regardless of the vehicle from which the snow is released, the experience is startling to the driver of the following vehicle. However, if the snow is from atop a large semi-trailer, and particularly if it has been hardened into ice, the event can not only be startling, but also very dangerous.

This has always been a concern of the trucking industry. Therefore, trucking companies spend considerable money to clear snow and ice from the roofs of trailers after every major snow storm. This effort not only takes money but also requires significant time, so that the operation of the trucks of a large fleet can be delayed significantly after a snowstorm. Furthermore, since the snow and ice removal has generally been done manually by workers shoveling from atop the trailers, employers and insurance companies are very concerned about the danger of such workers slipping and falling from the typically 13 foot high trailer roofs. Furthermore, at least one state, New Jersey, requires that such roof snow and ice be cleared before a truck moves onto a public road, but even without such requirements, there is a significant increase in fuel consumption, and therefore an increase in the cost of operation, if snow or ice is not removed.

Several devices exist that attempt to address this problem. U.S. Pat. No. 5,802,654 by Yeaglin, the inventor of the present application, discloses an immovable bridge like structure supporting a vertically adjustable wedge shaped snow plow that vehicles can move under to have snow or ice removed. U.S. Pat. No. 5,989,356 by Candeletti uses a snow removal scraper supported on a pillar installed on cement footings.

One of the problems with such structures is that they are very large in both width and height, and therefore occupy significant space, particularly considering that they must have significant free space around them to permit maneuvering semi-trailers into and through them. This problem is aggravated because the height of these structures requires particular care to assure their stability, and the situation is particularly bothersome to users who do not need a snow scraper throughout a large portion of any year.

Published Patent Application US200910282708 by Reed attempts to overcome this problem by supplying a structure that is not imbedded in the ground, but instead is held down by four removable concrete blocks which rest on two base plates attached at the bottom of the vertical supports of the bridge like structure. The snow scraper structure can then be moved to a storage location when not in use. This is accomplished by using two forklifts vehicles with 5000 pound capacity. The forklifts first lift each of the 3 ton concrete blocks off the base plate. Then, by inserting their forks into pockets within the two base plates at the bottom of opposite sides of the bridge structure, the two forklifts work in tandem to move the structure. This is no easy task since the structure weight is 8,800 pounds, is over 16 feet tall, and is approximately 17 feet wide.

Since it is clear that a movable snow scraper structure has the distinct benefit of being movable out of the way when not in use, it would be very beneficial to have such a movable snow scraper available, particularly for small businesses, that does not require the use of two heavy duty forklifts and two specially skilled operators who can operate in tandem on opposite sides of a wide, tall, and heavy structure such as the typical snow scraper.

SUMMARY

The snow and ice remover assembly for vehicle roofs has two vertical supports separated by a distance sufficient to move a vehicle between the vertical supports. A crossbar extends between and movable along the two vertical supports. A base structure is attached to the vertical supports and has wheels that engage a support surface upon which the snow and ice remover stands. A wheel movement prevention mechanism is also provided.

BRIEF DESCRIPTION OF THE DRAWINGS

The invention will now be described by way of example with reference to the accompanying figure, of which.

DETAILED DESCRIPTION OF THE EMBODIMENT(S)

Figure 1:
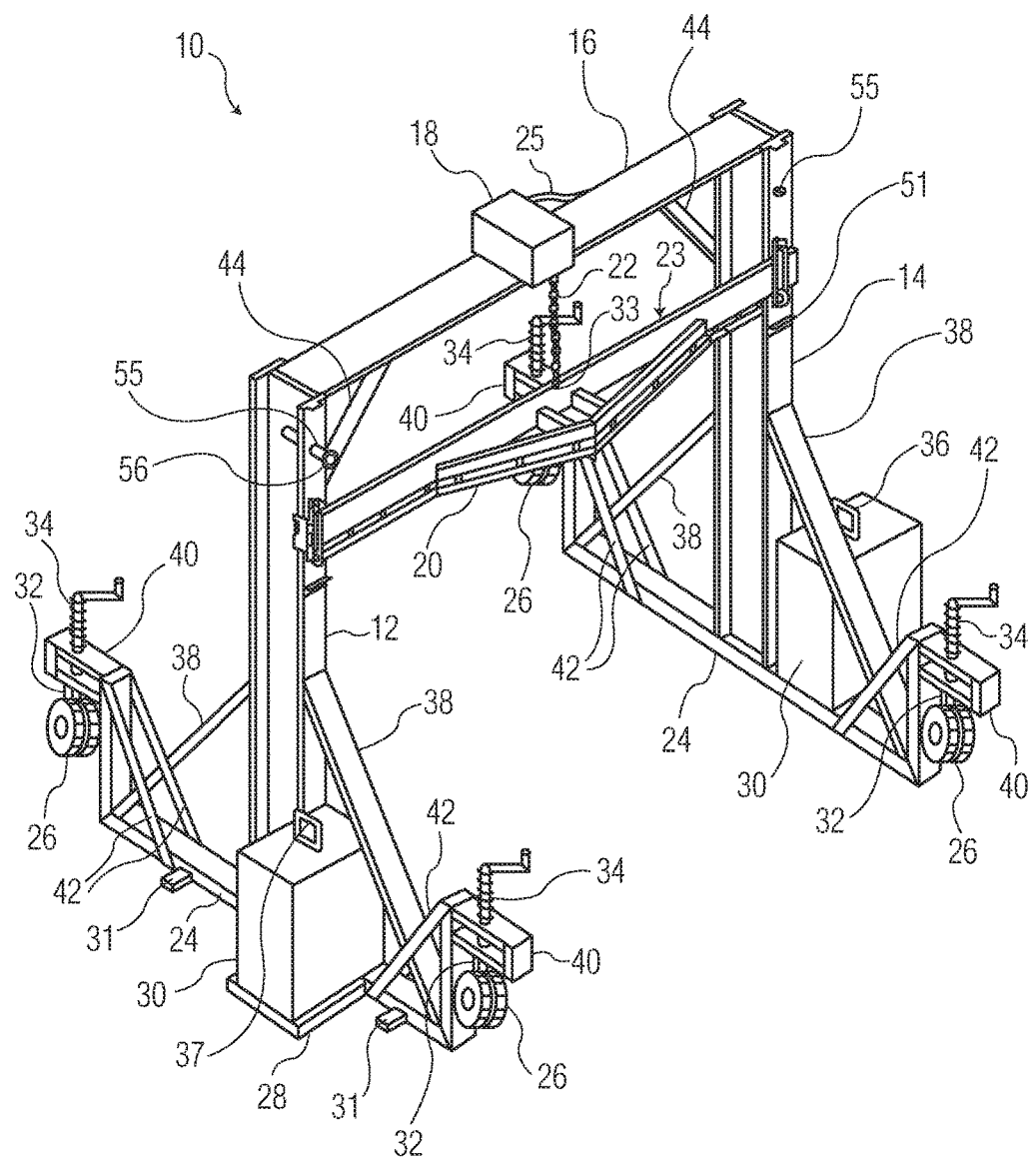
FIG. 1 is a perspective view of an exemplary embodiment of a snow and ice remover for vehicle roofs.

FIG. 1 is a perspective view of an embodiment that includes the basic structure of U.S. Pat. No. 5,802,654 by Yeaglin, which is incorporated herein by reference. Snow and ice remover 10 is constructed with vertical support "I" beams 12 and 14 and upper cross piece 16 forming an overhead bridge structure. In an embodiment, vertical support beams 12 and 14 extend approximately twenty feet above ground. They are also separated by a distance sufficient to easily move a typical semi-trailer with a container trailer or an open-top tarped trailer, deliver truck, school bus, or highway coach bus between them. The function of upper cross piece 16 is to support a winch 18, from which a plow assembly 23 is supported by chain 22 or cable connected to an eyelet 33. An operator at ground level can operate winch 18 to raise or lower snow plow assembly 23 to clear snow and ice from vehicles of different heights.

The winch 18 is a conventional electrically powered winch which is powered and controlled through cable 25. Cable 25 follows the structure of upper cross piece 16 and either beam 12 or 14 to a conventional control station (not shown) at ground level from which an operator can operate the winch 18 to raise or lower the plow assembly 23.

Figure 2:
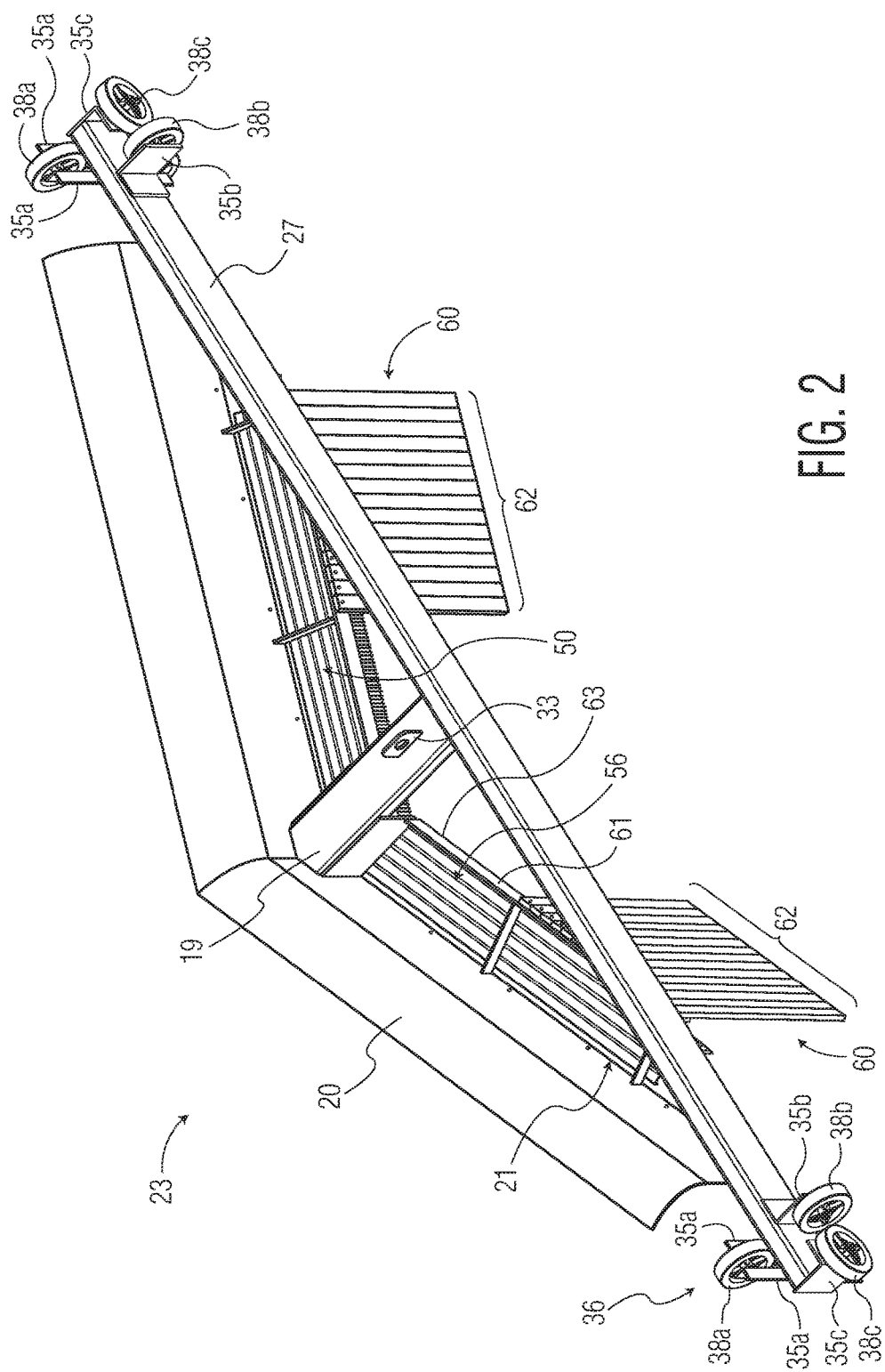
FIG. 2 is a detailed perspective view of the plow assembly used in an embodiment of FIG. 1.

Referring to FIG. 2, major components of the plow assembly 23 include a crossbar 27, plow wheel assemblies 36, plow 20, brush assemblies 50, and side wiper assemblies 60. Crossbar 27 extends between I-beams 12 and 14 by fixtures 35 attached to the ends of crossbar 27 and wrapped around outer edges of flanges of I-beams 12 and 14, respectively. Crossbar 27 is spaced from beam flanges by plow wheel assemblies 36. Two plow wheel assemblies 36 are positioned on the crossbar 27, at opposite ends of the crossbar 27, so that crossbar 27 can roll along the longitudinal axis of the I-beam flanges and maintain its original spacing from the flanges as it is raised and lowered by the winch 18.

Each plow wheel assembly 36 includes a plurality of wheels 38. In the embodiment illustrated in FIGS. 2, 4, and 5, a pair of first wheels 38a are mounted to two elongated L-shaped fixtures 35a. The pair of first wheels 38a are located in line with each other along the longitudinal axis of the "I" beams 12,14 and spaced apart from each other at opposite ends of the L-shaped fixtures 35a. A first side of each first wheel 38a is connected to one L-shaped fixture 35a, and a second side of each first wheel 38a is connected to the other L-shaped fixture 35a. The two elongated L-shaped fixtures 35a are fastened to a plow facing surface of the crossbar 27.

In the embodiment illustrated in FIG. 2, a second wheel 38b is mounted on an rear surface of the crossbar 27, opposite the plow facing surface, through an L-shaped fixture 35c. The second wheel 38b is aligned in the same direction as the pair of first wheels 38a.

Figure 3:
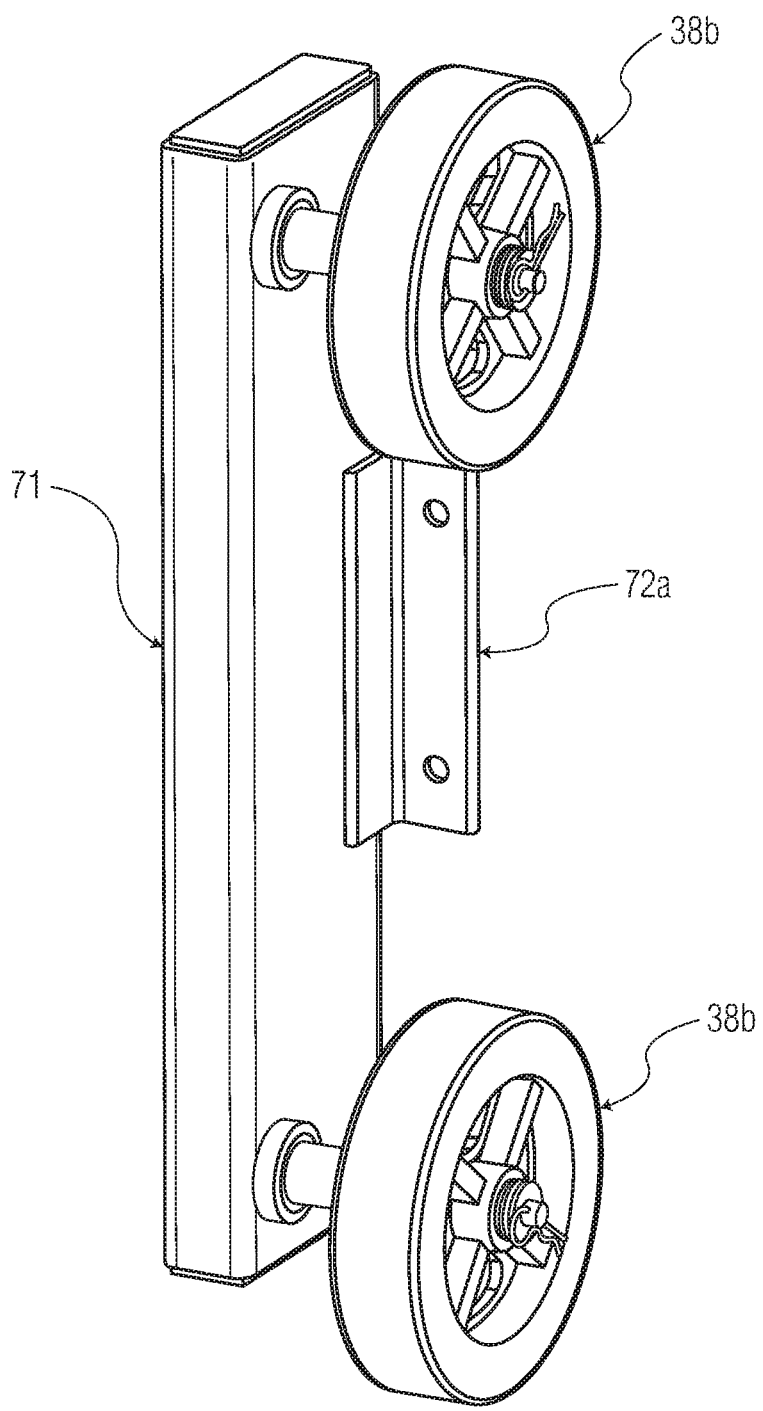
FIG. 3 is a perspective view of an exemplary wheel support member.
Figure 4:
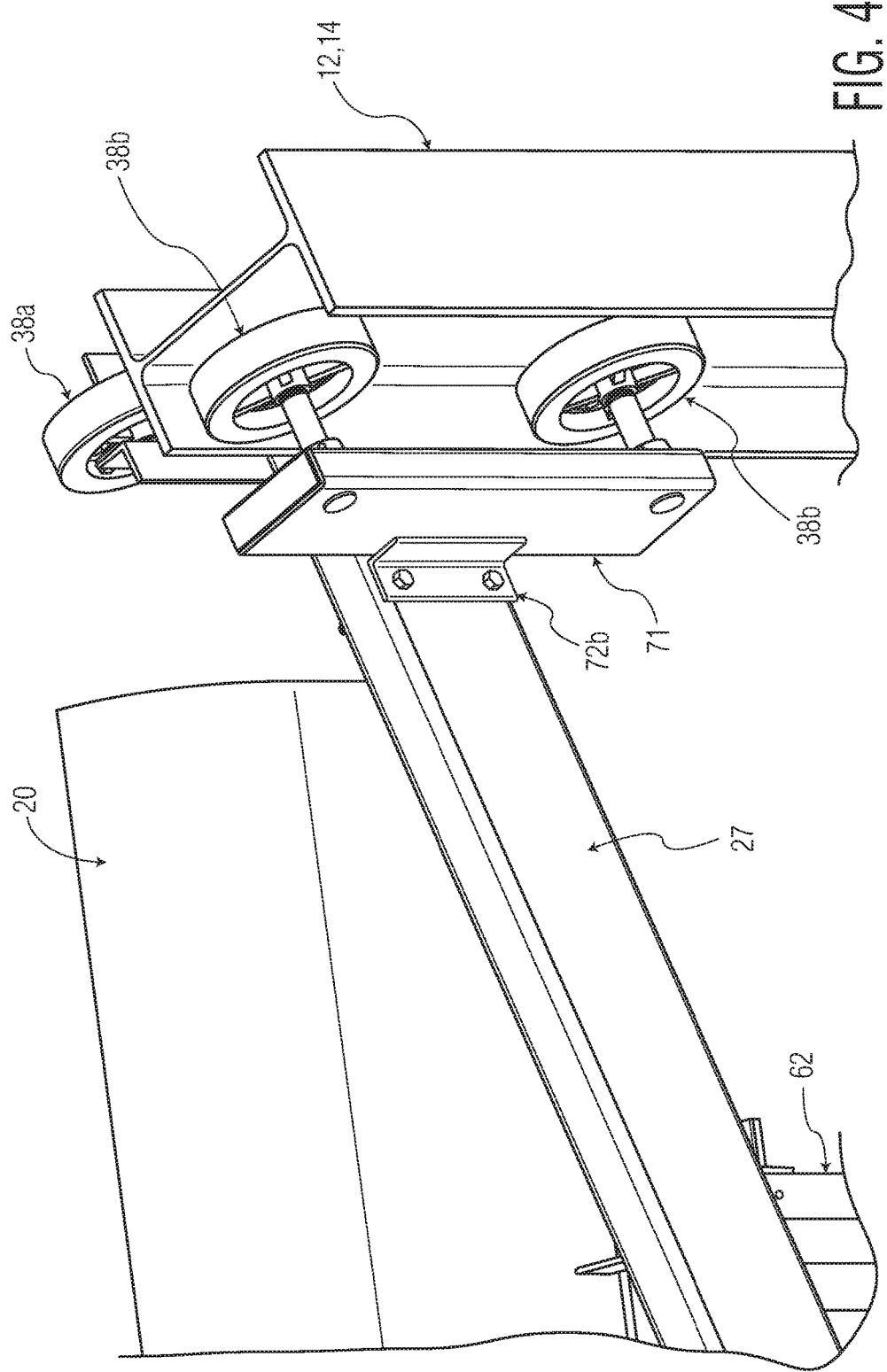
FIG. 4 is a perspective view of an exemplary plow wheel assembly engaging a vertical support I-beam.
Figure 5:
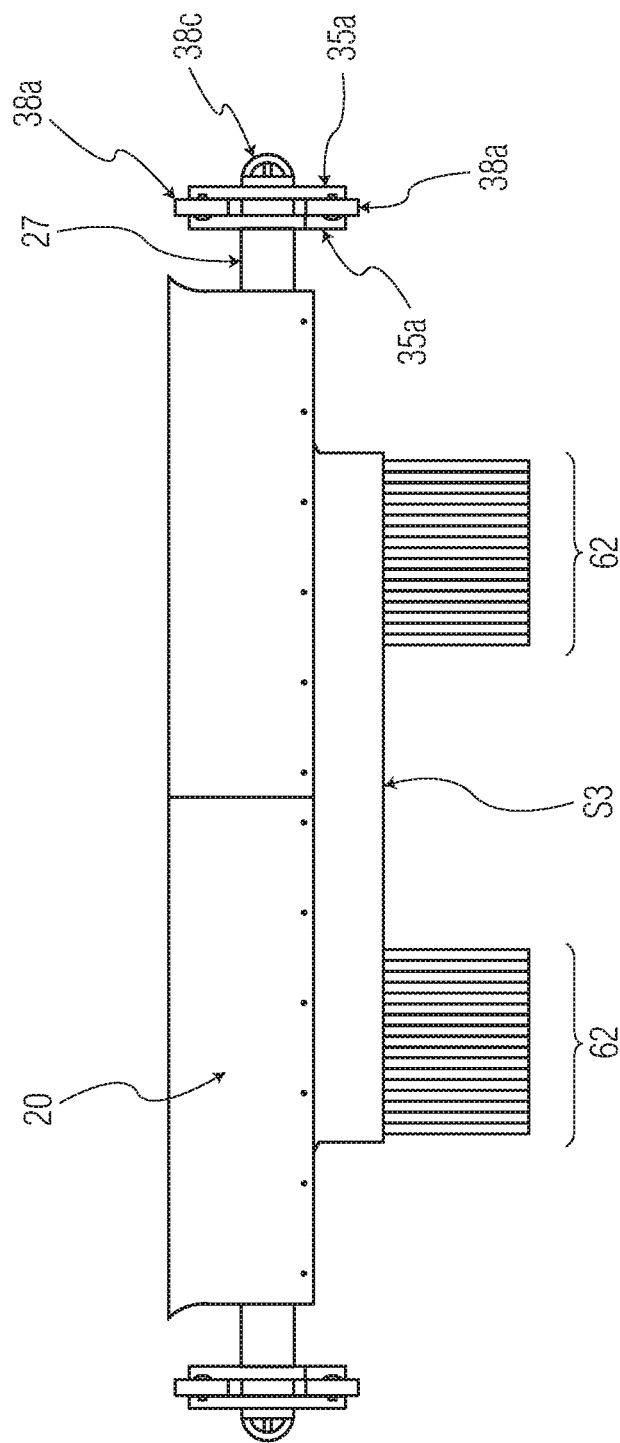
FIG. 5 is a front view of the plow assembly of FIG. 2.

In another embodiment illustrated in FIGS. 3 and 4, a pair of second wheels 38b are mounted to a first surface of a rectangular wheel support member 71. The pair of second wheels 38b are located in-line with each other along the longitudinal axis of the I-beams 12,14, and spaced apart from each other at opposite ends of the rectangular wheel support member 71. A first surface mounting bracket 72a is positioned between the pair of second wheels 38b and mounted on the first surface of the wheel support member 71, and connects the wheel support member 71 to the rear surface of the crossbar 27. A second surface mounting bracket 72b is positioned on a second surface opposite the first surface of the wheel support member 71 and connects the wheel support member 71 to the rear surface of the crossbar 27.

A third wheel 38c is mounted to an end surface of the crossbar 27 through an L-shaped fixture 35c. The third wheel 38c is aligned perpendicular to the direction of the first wheels 38a and second wheel 38b, and parallel with the rear surface along the longitudinal axis of the crossbar 27. See FIG. 2.

The plow 20 is attached at its ends to the cross bar 27 and though a support member 19 near its center. Brush assemblies 50 are attached to an edge 21 of the plow 20. Such attachment may be by welding, through the use of suitable fasteners or other suitable attachment means. It should also be understood that the plow 20 and brush assemblies 50 may be formed as an integral sub assembly otherwise referred to here as a roof sweeper. The plow 20 and brush assembly 50 in the shown embodiment are arranged in a v-shape to push snow to the sides of the vehicle roof as it passes under the vehicle roof sweeper 10. It should be understood that alternate shapes for the plow assembly 23 or roof sweeper are possible. For example the plow 20 may take different forms and the brush assembly 50 may take different forms.

Additionally the brush assembly 50 may be attached to the plow 20 in different ways. It may be linear, angled to one side, arcuate or other suitable shapes depending upon the desired removal path for snow from the vehicle top. Each brush assembly has a base plate 56 from which one or more rows of brushes 53 extend. Although two rows are shown in the embodiment, one row, three rows or more may be chosen according to design preferences. Each brush 53 may be formed of a material selected to have sufficient stiffness to push snow or ice while having sufficient flexibility to prevent scraping or other damage to the top surface of the vehicle passing through the vehicle roof sweeper 10. Additionally, brushes in each row may be of a different length from those in its adjacent row. For example, the brushes 53 may be formed of polypropylene, polyethylene, or other suitable brush materials and may be sized accordingly by a modular arrangement. Base plates 56 may be formed of metal and serve to both hold the brushes 53 and secure them to the plow 20 by welding, through the use of suitable fasteners or other suitable attachment means. The base plates may alternatively be formed of suitable composite or other materials.

The side wiper assemblies 60 are attached to an edge of the base plate 56 of brush assemblies 50. In the embodiment illustrated in FIG. 2, a pair of side wiper assemblies 60 are attached to each of the opposing end portions of the base plate 56 located towards the outer sides of the plow assembly 23. In another embodiment, the side wiper assemblies 60 are attached to opposing end portion edges 21 of the plow 20. The attachment may be by welding, through the use of suitable fasteners or other suitable attachment means. It should also be understood that the brush assemblies 50 and the side wiper assemblies 60 may be formed as an integral sub assembly. In another embodiment, the plow 20 and the side wiper assemblies 60 may be formed as an integral sub-assembly.

Each side wiper assembly 60 has a mounting plate 61 and a plurality of wiper strips 62 that extend in a row from the mounting plate 61. The mounting plate 61 can be attached to an edge 63 of the base plate 56 or to an edge 21 of the plow 20. Although one row of wiper strips 62 is shown in FIG. 2, two or three rows may be used. Each wiper strip 62 may be formed of a material selected to have sufficient stiffness to push snow or ice while having sufficient flexibility to prevent scraping or other damage to the side surfaces of the vehicle passing through the vehicle roof sweeper 10. For example, the wiper strips 62 may be formed of neoprene rubber, polypropylene, polyethylene, or other suitable wiper strip materials. The wiper strips 62 extend from the mounting plate 61 below the edge 21 of the plow 20 at a distance great enough to clear snow and ice from rounded roof edges such as those found on a typical school bus. In one embodiment, all of wiper strips 62 are equal in length. In other embodiments, the plurality of wiper strips 62 are different lengths and form a contoured lower edge, whereby the outermost wiper strips 62 are longer than the innermost wiper strips 62.

Generally the pair of second wheels 38b are used when the brush assemblies 50 or the side wiper assemblies 60 are attached to the plow assembly 23. The assemblies 50, 60 add weight to the plow assembly 23, and the balance of the plow assembly 23 is altered because the plow assembly 23 is suspended from the chain 22. The pair of second wheels 38b engaging with the I-beam surface maintains the plow assembly 23 balance and the plow assembly 23 remains vertically straight. If the plow assembly 23 were to tilt, the brushes 53 would not engage the roof surface as effectively. One of ordinary skill in the art would appreciate that the pair of second wheels 38*b* can also be used when the brush assemblies 50 or the side wiper assemblies 60 are not attached to the plow assembly 23.

Lower stops 51 are used to protect the vehicle being cleared of snow or ice. Lower stops 51 are attached to beams 12 and 14 at a height appropriate for the vehicles being cleared by a particular vehicle roof sweeper 10, so that the selected vehicle being driven under vehicle roof sweeper 10 is not damaged by plow assembly 23. Stops 51 are typically installed 13 feet above the ground but clearly could be installed at different heights, and could also be attached by welding, or adjustably by bolts or other fasteners, so that their heights could occasionally be changed.

Upper stop holes 55 are located on the beams 12 and 14 just below the cross piece 16 and are also used for safety purposes. When the vehicle roof sweeper 10 is taken out of service for long periods of time, for instance during summer, the plow assembly 23 can be raised to its maximum height and support pins 56 (only one shown) inserted through upper stop holes 55. This arrangement supports the plow assembly 23 and takes the weight off of chain 22 while the plow assembly 23 is high above any truck or trailer roofs.

The present invention departs dramatically from the structure of the Yeaglin patent and other such snow and ice removers by no longer embedding beams 12 and 14 in the ground, but instead, stably supporting the snow and ice remover 10 on base structures 24. In an exemplary embodiment, retractable wheels 26 can be used. Base structures 24 can also each include a platform 28 so that when wheels 26 are retracted, as shown in the FIG. 1, base structures 24 sit on the support surface. When snow and ice remover 10 is in use clearing snow, ballasts 30, typically made of concrete, can be placed on platforms 28 to prevent movement of snow and ice remover 10 as a vehicle moves through it for snow and ice clearing. Additional means to prevent such movement of the structure can include plates 31 which are attached to base structures 24 and include holes through which locking devices such as stakes or other devices can be inserted into the support surface.

Operation of the vehicle roof sweeper 10 will now be described. Once the working height of plow 20 is set by the use of the winch 18, all that is required is that a vehicle be slowly driven under vehicle roof sweeper 10 in the direction indicated by arrow A. Since all that is needed is relative motion between plow 20 and the roof of the vehicle, it is immaterial that the vehicle is in motion rather than the plow, so snow and ice will be pushed off the roof and over the sides and rear of the vehicle. It should be appreciated that even with a trailer moving at only one mile per hour, it will take less than a minute to clear the roof of a typical trailer.

The present invention therefore provides an inexpensive, rapid, and safe way to clear snow and ice from truck and trailer roofs.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims. For example, plow 20 can be constructed with various heights to accommodate the weather of different regions, it could be constructed with a single angled blade so that snow and ice are pushed off only one side of the vehicle, or it can be constructed with a curved surface at the upper edge to deflect snow and ice downward to assure they do not go over the top of the plow.

Stably supporting the vehicle roof sweeper 10 are base structures 24 which include retractable wheels 26. The base structures 24 also each include a platform 28 so that when the wheels 26 are retracted, as shown in FIG. 1, the base structures 24 sit on the support surface. When the vehicle roof sweeper 10 is in use clearing snow, ballasts 30, typically made of concrete, are placed on platforms 28 to prevent movement of vehicle roof sweeper 10 as a vehicle moves through it for snow and ice clearing. Additional means to prevent such movement of the structure are plates 31 which are attached to base structures 24 and include holes through which locking devices such as stakes or other devices can be inserted into the support surface.

Four sets of dual wheels 26 can be mounted on swivel casters 32 held at the ends of base structures 24 by jack supports 40. Therefore, once the wheels are lowered and lift the structure, snow and ice remover 10 can be moved in any direction. Additionally, when the wheels are retracted, the base structures sit on the ground, and, in fact, since the lowered wheels also are on the ground as the unit is lifted, the structure is never out of contact with the ground.

In another embodiment, wheels 26 and casters 32 are mounted on trailer type wheel jacks 34, and each jack 34 is rated for 5,000 pound lifting capacity. When snow and ice remover 10 is to be moved, ballasts 30 are removed from platforms 28 using lifting hooks 36 or some other lifting structure. The removal of the ballasts can easily be accomplished by a small fork lift. Then wheels 26 are lowered using wheel jacks 34, thereby raising snow and ice remover 10 so that base structures 24 are typically about 2 inches off the ground. In an exemplary embodiment, ballasts 30 each weigh 2,000 pounds, and when the ballasts are removed, snow and ice remover 10 weighs 2,700 pounds. In another embodiment, when the ballasts 30 are removed, the vehicle roof sweeper 10 weights about 4,300 pounds.

Vertical support beams 12 and 14 are attached to base structures 24, and stabilizing supports 38 prevent motion between them. Stabilizers 44 are also attached between upper cross piece 16 and vertical support beams 12 and 14 to prevent distortion of the structure. Similarly, jack stabilizers 42, which are attached between jack supports 40 and base structures 24, stabilize jacks 34, casters 32, and wheels 26. Therefore, snow and ice remover 10 will not distort or tip either when it is functioning to remove snow and ice or when it is being moved. This stability holds even when the unit is in service on, or being moved on, a rough stone surface.

The present invention thereby is advantageously easily and safely moveable to permit storage when it is not in use and it also advantageously provides snow/ice removal with reduced likelihood of damage to the upper surface of the vehicle being cleared.

It is to be understood that the form of this invention as shown is merely an exemplary embodiment. Various changes may be made in the function and arrangement of parts; equivalent means may be substituted for those illustrated and described; and certain features may be used independently from others without departing from the spirit and scope of the invention as defined in the following claims. For example, devices other than "I" beams can be used for vertical support structures 12 and 14, and various devices, and materials can be used for base structures 24 and stabilizers 38, 42 and 44. The brush assemblies 50 and side wiper assemblies 60 can each be used independently with the plow 20, or in combination together with the plow 20.

What is claimed is:

1. A snow and ice remover assembly for vehicle roofs comprising:
   two vertical supports separated by a distance sufficient to move a vehicle between the vertical supports;
   a roof sweeper movable along the two vertical supports;
   a base structure attached to the vertical supports and having wheels engaging a support surface upon which the snow and ice remover stands; and
   jacks that raise the wheels off of the support surface and lower the snow and ice remover on to the support surface.

2. The snow and ice remover assembly of claim 1 wherein the roof sweeper is supported by a crossbar.

3. The snow and ice remover of claim 1, further comprising an assembly securing mechanism having plates attached to the base structure, wherein the plates include holes through which locking devices such as stakes and other devices can be inserted into the support surface.

4. The snow and ice remover of claim 1, further comprising an upper crosspiece extending between the vertical supports.

5. The snow and ice remover of claim 4, further comprising a winch supported by the upper crosspiece.

6. The snow and ice remover of claim 5, wherein the winch is operatively connected to the roof sweeper.

* * * * *